Nov. 2, 1965  E. L. WALTERS  3,215,269

SHEET HANDLING APPARATUS

Filed Jan. 27, 1961  4 Sheets-Sheet 1

INVENTOR.
Emmett L. Walters
BY
Hobbe & Swope
ATTORNEYS

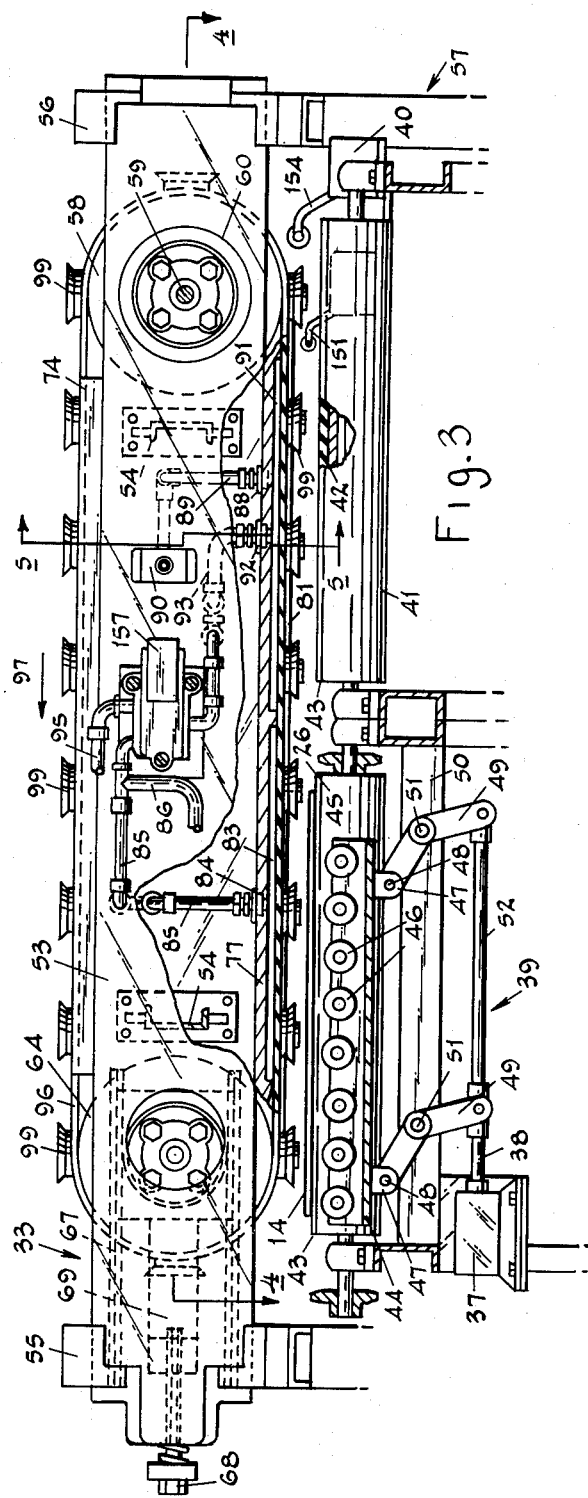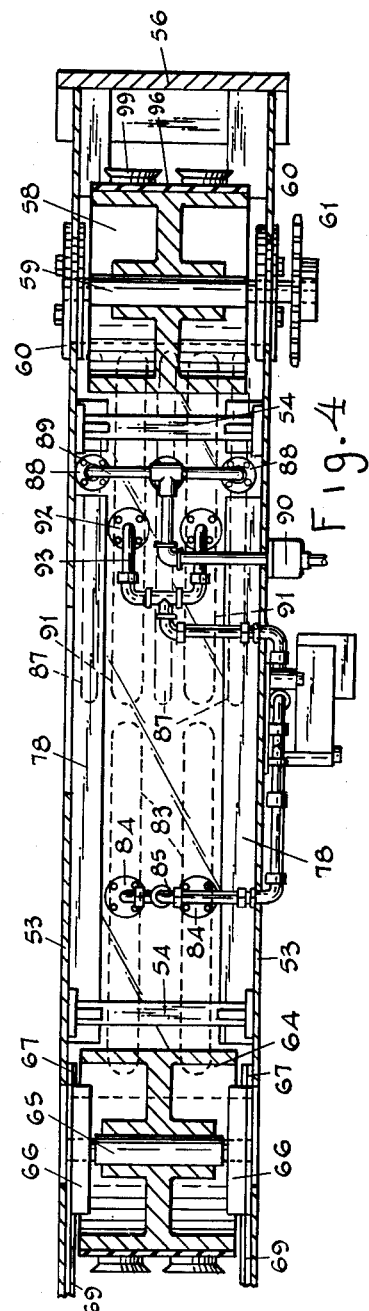

Nov. 2, 1965  E. L. WALTERS  3,215,269

SHEET HANDLING APPARATUS

Filed Jan. 27, 1961  4 Sheets-Sheet 3

INVENTOR.
Emmett L. Walters
BY
Nobbe & Swope
ATTORNEYS

INVENTOR.
Emmett L. Walters
BY
Hobbe & Swope
ATTORNEYS

United States Patent Office 3,215,269
Patented Nov. 2, 1965

3,215,269
SHEET HANDLING APPARATUS
Emmett L. Walters, Toledo, Ohio, assignor to Libbey-Owens-Ford Glass Company, Toledo, Ohio, a corporation of Ohio
Filed Jan. 27, 1961, Ser. No. 85,279
16 Claims. (Cl. 209—73)

This invention relates broadly to apparatus for handling sheets of glass or the like, and more particularly it relates to a novel conveyor apparatus for sorting and segregating such sheets.

In making glass sheets, a continuous ribbon of glass is drawn from a molten mass, and sheets having the desired dimensions are then cut from the continuous ribbons. These sheets occasionally contain imperfections such as bubbles, impurities, or chipped areas, thereby necessitating that they be sorted and segregated according to quality. It is generally desirable to separate the sheets into three classes, one of the classes containing sheets of inferior quality which are not usable and are collected for remelting. Of the two usable classes, one contains first or prime quality sheets having no imperfections while the other contains second quality sheets having only imperfections which can be corrected or which are not serious enough to render the sheet unfit for its intended use.

It is therefore an object of this invention to provide a conveyor apparatus for sorting and separating oncoming sheets of glass or the like according to a predetermined characteristic such as quality.

It is another object of the invention to provide apparatus for discarding selected sheets from the conveyor prior to the separation of the remaining sheets.

Still another object of the invention is to provide a diverting conveyor and associated control apparatus for selecting and removing certain sheets from one conveyor and depositing them on another conveyor.

Other objects and advantages of the invention will become more apparent during the course of the following description when taken in connection with the accompanying drawings.

In the drawings wherein like numerals are employed to designate like parts throughout the same:

FIG. 3 is an enlarged sectional view taken on the line 3—3 of FIG. 1;

FIG. 4 is a sectional view taken on the line 4—4 of FIG. 3;

Figure 1:
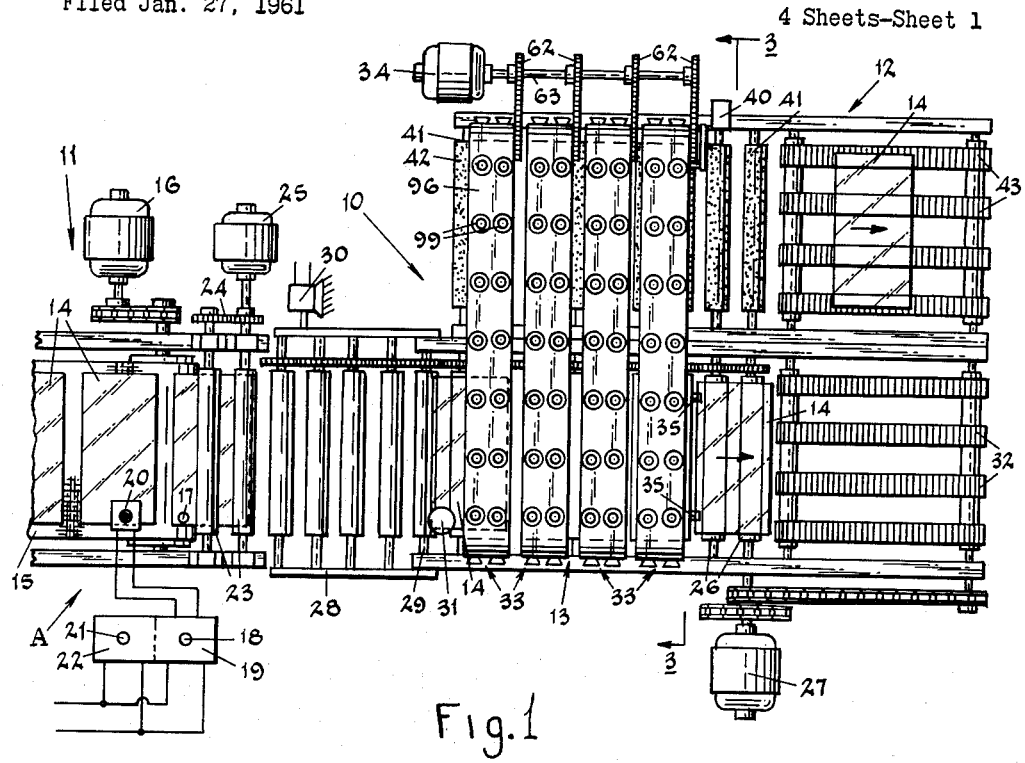
FIG. 1 is a plan view of the sorting apparatus.
Figure 2:
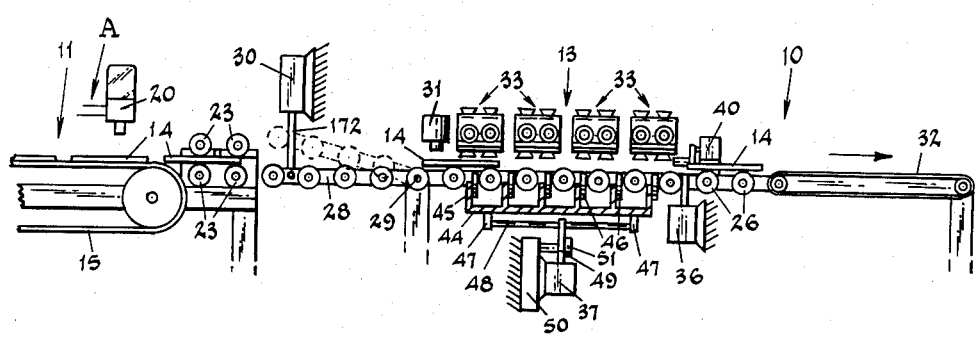
FIG. 2 is an elevation of the sorting apparatus as viewed from the bottom of FIG. 1.

Referring particularly to FIGS. 1 and 2 of the drawings, the sorting apparatus is indicated generally by the numeral 10 and is comprised of a primary conveyor 11, a secondary conveyor 12 parallel to the terminal end of said primary conveyor, and a diverting conveyor 13 overlying an intermediate portion of the primary conveyor 11 and the initial portion of the secondary conveyor 12.

As shown in FIGS. 1 and 2, the sheets 14 are advanced along the primary conveyor 11 on an endless belt 15 driven by a motor 16 (FIG. 1). As each sheet approaches the forward extremity of the belt 15, its quality is determined by an operator at station A. First quality sheets are permitted to pass while second quality sheets are marked with a spot of dye 17 along one edge by the operator who depresses a button 18 to momentarily close a switch 19 (FIGS. 1 and 7), thereby releasing a drop of dye from the reservoir 20 which is positioned above the aforementioned edge of the sheet 14. However, if the sheet 14 is of inferior quality and unfit for use, the operator depresses the button 21 to momentarily close switch 22 (FIGS. 1 and 7), thereby raising a section of the primary conveyor 11 to drop the inferior sheet into a cullet bin beneath the conveyor. The circuitry containing both switches 19 and 22 will be described in conjunction with FIG. 7.

Although the preferred method of marking glass sheets of the second quality is to apply a spot of dye to their surfaces, it is to be considered within the contemplation of the invention to provide suitable indicia on the glass sheet for indicating its classification in a number of other well-known ways. For example, the sheets may be marked by a chalk or crayon mark, or a dot of loose material may be adhered to the glass surface by striking the sheet with a small pad of felt or other similar material.

A cluster of accelerating rolls 23, interconnected by gears 24 (FIG. 1), is driven by a motor 25 to speed up the advance of each sheet 14 as it leaves the belt 15. First and second quality sheets 14 are deposited upon the roll type conveyor 26 which is driven at the rate of said accelerating rolls 23 by a motor 27 (FIG. 1). Adjacent the accelerating rolls 23, a section 28 of the conveyor 26 is pivoted at 29 and connected to the piston of a conventional air or hydraulic cylinder 30 (FIGS. 1, 2 and 7), the cylinder 30 being responsive to closure of the switch 22 in a manner to be disclosed in the description of FIG. 7 hereinafter, to thereby raise the section 28 of the conveyor 26 to remove inferior sheets 14 from the primary conveyor 11 and drop them into a cullet bin (not shown) located below.

The first and second quality sheets 14, continuing to advance upon the conveyor 26, pass under a photoelectric cell 31 (FIGS. 1, 2 and 7) which is aligned with the reservoir 20 and in close proximity to the diverting conveyor 13. The photoelectric cell 31 is nonresponsive to clear glass sheets and consequently the first quality sheets 14 continue on the roll conveyor 26 beyond the diverting conveyor 13 and onto a multiple belt type conveyor 32, also driven by the motor 27, for unloading. However, the photoelectric cell 31 is responsive to the dye spot 17 on each second quality sheet 14 to thereby actuate apparatus, to be further described hereinafter, which transfers each of the second quality sheets to the diverting conveyor 13. The diverting conveyor 13 comprises a plurality of vacuum operated belt conveyors 33, the lower flights of which are advanced by a motor 34, above the primary and secondary conveyors 11 and 12 and at rights angles thereto, in a direction toward the secondary conveyor 12. The conveyors 33 will be described in detail hereinafter.

The photoelectric cell first actuates a pair of solenoids 36 to extend their armatures 35 (FIGURES 1, 2 and 7) upwardly between a pair of rolls of the conveyor 26 at the right of the diverting conveyor 13 and into the path of an advancing second quality sheet 14 to thereby halt the advance of the sheet by the primary conveyor and align the sheet with the diverting conveyor 13. After a short delay, another fluid operated cylinder 37 (FIGS. 2, 3 and 7) is energized to retract the shaft 38, thereby elevating a transfer apparatus 39 (FIGS. 2 and 3) to raise the sheet 14 above the primary conveyor 11 and press it into firm contact with the lower flight of the diverting conveyor 13 where is is held by vacuum. The sheet 14 moves the diverting conveyor 13 to a position above the initial portion of the secondary conveyor 12 where the lead edge of the sheet engages and closes a switch 40 (FIGS. 1, 2, 3 and 7) to momentarily interrupt the vacuum holding the sheet onto the diverting conveyor 13 and introduce air pressure to this portion of the diverting conveyor, thereby dropping the sheet onto the secondary conveyor 12. The transfer apparatus 39 is fully described later in this specification.

The rolls 41 of the conveyor 12, particularly in the drop area, are covered with a special cushioning material 42, as shown in FIG. 3, to soften the fall of the glass sheet and prevent breakage. The secondary conveyor 12 is shown in FIG. 1 in contacting, side-by-side relation with the conveyor 26 of the primary conveyor 11 and with the shafts of the rolls of conveyors 26 and 32 extended through the rolls of the secondary conveyor 12 to provide a common drive from the motor 27. It is obvious that these conveyors may be spaced apart by a reasonable amount and that the secondary conveyor 12 may be driven independently. An unloading conveyor 43, substantially identical in construction with the conveyor 32 at the end of the primary conveyor 11, forms the terminus of the secondary conveyor 12.

The transfer apparatus 39, shown generally in FIG. 2 and in more detail in FIG. 3, is comprised of a shallow frame 44 supporting a plurality of ribs 45 which project upwardly between adjacent rolls of the conveyor 26 below the diverting conveyor 13. Each of the ribs 45 carries a plurality of rollers 46, the rollers on the several ribs collectively forming a horizontal plane above the level of the ribs. Four lugs 47 are attached to the underside of the frame 44 in a balanced relation with the lugs aligned transversely in pairs. Each transversely aligned pair of lugs 47 is joined by a pivot rod 48 which passes through the upraised end of one or more bell cranks 49, the bell cranks being pivoted centrally to a cross-member 50 on a pin 51. The lower ends of the bell cranks 49 are connected to a rod 52 which is an extension of the armature 38 for the fluid cylinder 37.

The transfer apparatus 39 is in its lowermost position, as shown in FIG. 3, when the solenoid actuating the fluid cylinder 37 is not energized. However, when current is applied, to the solenoid, the armature 38 is retracted, thereby pivoting each bell crank 49 about a pin 51 to raise the frame 44 and the rollers 46 which in turn lift the sheet 14 from the conveyor 11 into engagement with the lower flight of the diverting conveyor 13. The cycling of the transfer apparatus 39 will be fully described in conjunction with the discussion of FIG. 7.

Figure 5:
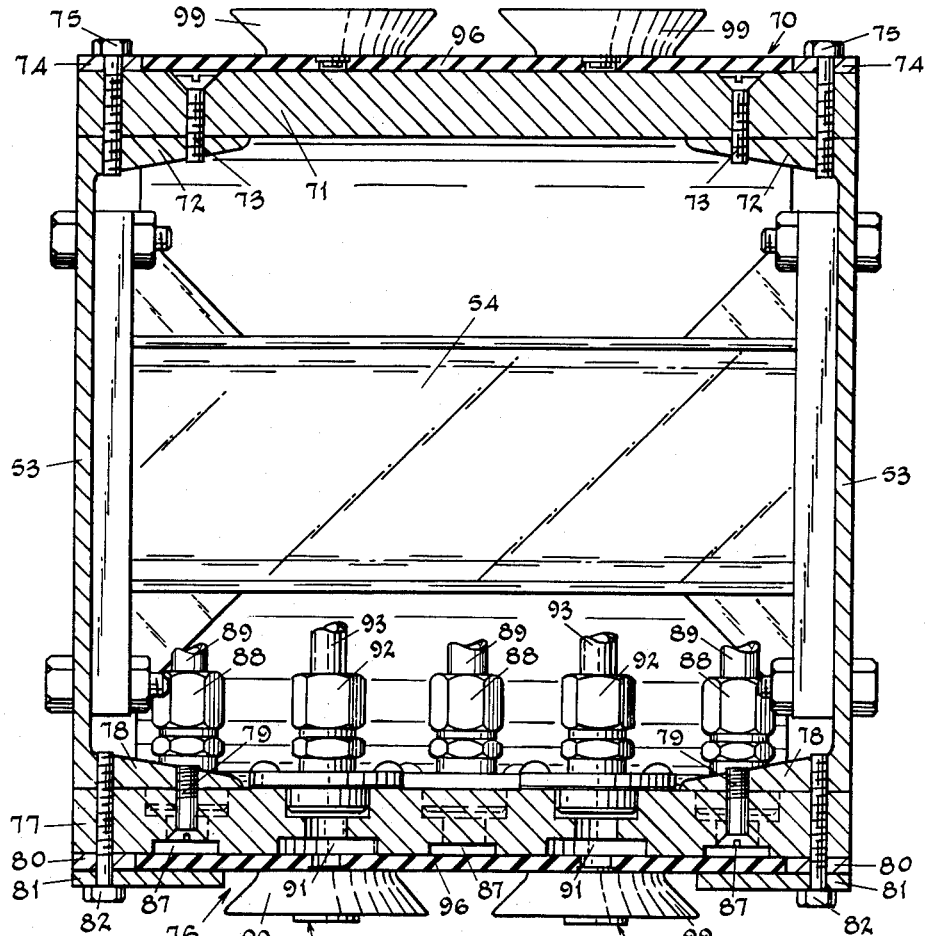
FIG. 5 is an enlarged cross-section of the diverting conveyor taken on the line 5—5 of FIG. 3.

As shown in FIGS. 1 and 2, the diverting conveyor 13 is comprised of a plurality of individual conveyors 33 in side-by-side relation. Since the conveyors 33 are identical in construction, the following description of a single conveyor, shown in FIGS. 3, 4 and 5, is applicable to all.

There is illustrated in FIGS. 3 and 4 a pair of side channels 53 held in spaced, upright position by a pair of cross-channels 54 and end members 55 and 56, all supported as a unit on a framework 57 in a manner to extend over an intermediate portion of the primary conveyor 11 and the initial portion of the secondary conveyor 12. A flat-faced driving pulley 58 is secured to an axle 59 which is journaled in a pair of bearings 60 individually mounted in the side channels 53. A sprocket 61 is secured to one end of the axle 59 outside a side member and is connected by a chain 62 to the output shaft 63 of the motor 34 (FIG. 1).

An adjustable idler pulley 64 is fastened to an axle 65 which is journaled in a pair of bearing blocks 66 at the end of the side channels 53 opposite the driving pulley 58. The bearing blocks 66 are movable in ways 67 toward and away from the driving pulley 58 by means of an adjusting screw 68 (FIG. 3) which is in threaded engagement with a yoke 69 attached to the bearing blocks 66.

A channel 70 (FIG. 5) is formed by attaching a solid plate 71 to the top side of inwardly turned upper flanges 72 of the side channels 53, as by screws 73, and by also attaching a pair of guides 74 to the flanges 72 on opposite edges of the upper surface of the plate 71, as by screws 75.

A similar channel 76 (FIG. 5) is formed by a valve plate 77 attached to the lower flanges 78 of the side channels 53, as by screws 79, and by a flanking pair of guides 80 which are each capped on the lower side by a belt support member 81 extending inwardly over a marginal portion of the channel 76. Screws 82 hold the guides 80 and the support members 81 in the relative positions shown in FIG. 5.

The bottom surface of the valve plate 77, adjacent the idler pulley 64 and over the primary conveyor 11, is recessed longitudinally on either side of the center line as indicated by the numeral 83 (FIGS. 3 and 4). Each recess 83 is connected by means of a port 84 and piping 85 to an evacuating conduit 86 (FIG. 3). In other words, the recesses 83 are at all times connected to an evacuating source.

The bottom surface of the valve plate 77, adjacent the driving pulley 58 and over the secondary conveyor 12, i.e., in the sheet discharge area, is provided with five longitudinally extending recesses (FIGS. 3, 4 and 5). The two outside recesses and the centrally located recess, all indicated by the numeral 87, are connected through ports 88, piping 89 and a solenoid operated valve 90 to the evacuating conduit 86.

Each of the two remaining recesses, identified at 91, is selectively connected through a port 92, piping 93 and a solenoid operated valve 94 to either the evacuating conduit 86 or to a fluid pressure supply conduit 95. Thus, as will be brought out later, these recesses, on proper energization of the valve 94, cause pressurized air to break the vacuum hold on the glass sheets and drop them onto the conveyor 12.

The three recesses 87 insure that the belt, to be described hereinbelow, will be held against the valve plate 77 while carrying sheets, particularly in the discharge region. This is important since it was found that without the recesses 87, as the sheets moved along a transfer operation, their weight would tend to pull the belt downwardly, particularly near its center, unsupported part, thereby separating the belt from the valve plate 77 and permitting air to enter between the belt and plate. This breaking of the vacuum would, of course, cause the sheets to be prematurely dropped. It is even more important to provide the vacuum in the recesses 87 during the sheet removal operation, wherein pressurized air is used, since an even greater tendency for vacuum leakage and resultant premature discharging is encountered.

An endless rubber belt 96 is supported on the pulleys 58 and 64 and moves within the channels 70 and 76 in the direction of the arrow 97 (FIGS. 3 and 5) or, more specifically, the lower flight moves from the primary conveyor 11 toward the secondary conveyor 12. The belt is provided with two rows of ports 98, aligned with the recesses 83 and 91 as shown in FIG. 5, and each port is covered by a vacuum cup 99, the vacuum cup normally being closed by a weighted gravity-action valve 100 (FIG. 6) when in the lower flight.

Figure 6:
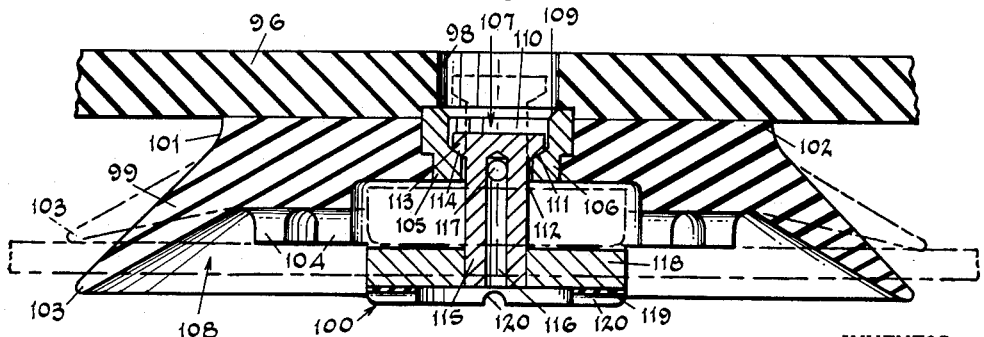
FIG. 6 is an enlarged section of a vacuum cup attached to the diverting conveyor belt.

Each of the vacuum cups 99 is made of a resilient, airimpervious material and is comprised of a circular base 101 which is fastened to the belt 96 by vulcanizing or cementing as at 102, a lip 103 flaring outwardly from the base 101, and stops 104 which limit the amount the lip 103 can be deflected by a sheet of glass 14 when pressed against a cup 99, as shown in broken lines in FIG. 6.

A valve seat 105 having a shouldered exterior diameter 106 is recessed within the base 101 of the cup 99, and the valve seat 105 is provided with a central opening 107 connecting the opening 98 in the belt 96 with the interior 108 of the vacuum cup 99. The opening 107 is beveled inwardly at 109 from the diameter of the opening 98 to a reduced diameter 110, which in turn terminates at a spherical seat 111 and continues at a still smaller diameter 112 into the interior cavity 108 of the vacuum cup 99.

The valve 100 is comprised of an enlarged top portion 113 provided with a spherical seat 114 complementary to the seat 111, and a stem portion 115 depending through the opening 112 to a terminus slightly above the level of the lip 103 when in the solid line position of FIG. 6. A blind hole 116 is drilled upwardly along the central axis of the stem 115 to a juncture with a cross-drilled hole 117 at the base of the seat 114. An annularly shaped button 118 is pressed onto the lower end of the stem 115 so as to be flush with the bottom end thereof, and a rubber washer 119 is cemented to the lower marginal surface of the button 118 to prevent marring of the surfaces of the glass sheets 14 upon contact. A plurality of semi-cylindrical notches 120 extend radially from the inside diameter to the outside diameter of the washer. Though some air within the cavity 108 may be evacuated through the space between the outside diameter of the valve stem 115 and the adjacent surface of the opening 107, the passageways 120, 116 and 117 are provided to allow unrestricted movement of air within the cavity when the valve 100 is raised to the broken line position of FIG. 6.

In the following description of the operation of the sheet sorting apparatus 10, reference is made to FIGS. 1 through 7. Although as shown in FIGS. 1 and 2, the sheets of glass 14 to be sorted are uniform in dimensions, the apparatus is not restricted to sheets of the specific dimensions shown, but either dimension may be increased or decreased within the physical limitations of the apparatus.

As shown in FIGS. 1 and 2, the sheets 14 are advanced in closely spaced relation into the grading station A where they are visually inspected by an operator. If a particular sheet is of first or prime quality the operator permits it to continue between the speed-up rolls 23, over the roll conveyor 26 and onto the multiple belt conveyor 32 where it is unloaded for stacking on a buck or packing into boxes.

Figure 7:
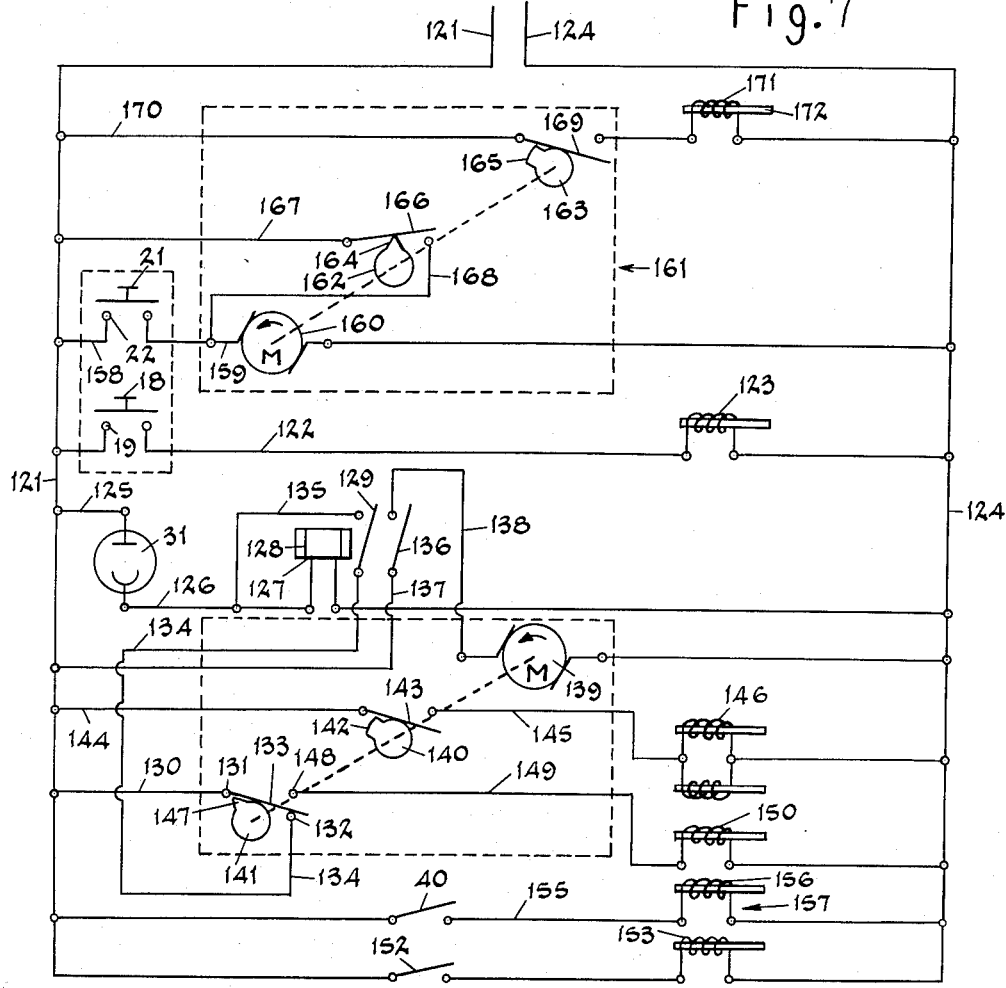
FIG. 7 is a diagram of the sensing and control circuits for cycling the diverting conveyor.

However, if the sheet of glass 14 is classified as second quality by the operator, he depresses the button 18 to momentarily close switch 19 which establishes a circuit from the main 121, through the closed contacts of switch 19 and line 122, through a solenoid 123 connected to the dye reservoir 20 (FIGS. 1 and 2), to the main 124 thereby releasing a drop of a soluble dye 17 onto the upper surface of the sheet 14 to indicate that it has been classified as second quality. The sheet then continues through the accelerating rolls and is advanced along the roll conveyor 26 until the dye spot 17 comes within the field of the photoelectric cell 31 (FIGS. 1, 2 and 7). The photoelectric cell 31 then completes a circuit from the main 121 through a branch line 125 to the photocell 31, and from the photocell through a line 126, which extends through the coil 127 of a relay 128, to the opposite main 124. Upon closure of the contacts 129 of the relay 128, a holding circuit for the relay 128 is established from main 121, through a branch line 130, the normally closed contacts 131–132 of a switch 133, line 134, contacts 129, and line 135 which is joined to the line 126 in advance of the coil 127 for the relay 128.

Another pair of contacts 136 of the relay 128 are closed when the coil 127 is energized, thereby establishing a circuit from main 121 through branch line 137, contacts 136, line 138 and through a motor 139 of a timing device to the opposite main 124. As the motor 139 rotates, it carries with it a pair of cams 140 and 141, the cam 140 being timed slightly in advance of the cam 141. After the sheet 14 activates the photocell 31 and just prior to its arrival at the armatures 35, the rise 142 on the cam 140 closes the normally open contacts of switch 143 and holds the switch closed until the sheet is picked up by the diverting conveyor 13 in the manner to be described below. During the time the contacts of switch 143 are held closed, a circuit is established from main 121 through branch line 144, switch 143, line 145 and through the coil 146 of the solenoids 36 to the opposite main 124, thereby extending the armature 35 above the level of the conveyor 26 to engage the leading edge of the sheet 14 and square the sheet on the roll conveyor 26 beneath the diverting conveyor 13.

Also while the switch 143 is held closed by the cam 140 and while the armatures 35 of the sheet aligning solenoids 36 are extended, the cam 141 rotates so that the rise 147 thereon opens contacts 131–132 and closes contacts 131–148 of the switch 133. Closure of the contacts 131–148 establishes a circuit from main 121 through branch line 130, contacts 131–148 of switch 133, line 149 and through the coil 150 of the fluid cylinder 37 (FIGS. 2, 3 and 7) to the opposite main 124, thereby retracting the armature 38 of the fluid cylinder 37 to rotate the bell cranks 49 about their pivots 51. Rotation of the bell cranks 49 elevates the transfer apparatus 39 (FIGS. 2 and 3) and lifts the sheet 14, upon the rollers 46, into firm, but brief contact with a plurality of the vacuum cups 99. The sheet raises the valve 100 of each engaged vacuum cup and displaces the lip of each said cup upwardly and into sealing relation with the sheet of glass, as shown in broken lines in FIG. 6, thereby transferring the sheet 14 from the roll conveyor 26 to the lower flight of the diverting conveyor 13.

Upon closure of the contacts 131–148 of switch 133, contacts 131–132 are opened to de-energize the holding circuit through the relay coil 127, and the motor 139 comes to rest with the cams 140 and 141 in the position shown in FIG. 7, the switch 143 being open and the contacts 131–132 of switch 133 being closed. Both the sheet aligning armatures 35 and the transfer apparatus 39 are then in the lowered position and movement along the primary conveyor is unobstructed.

A sheet of the second quality is moved along the lower flight of the diverting conveyor above the secondary conveyor 12 until the leading edge of the sheet engages the lever 151, thereby closing switch 152. A circuit is then formed from main 121, through switch points 152 (now closed), to energize solenoid coil 153, the other side of which is connected to main 124. The solenoid coil 153 opens valve 90 to provide a connection between the evacuating chamber 86 and the recesses 87, thereby creating a region of reduced air pressure between the belt 96 and the plate 77 for the purpose described above.

Shortly thereafter, the leading edge of the glass sheet 14, still moving on the lower flight of the diverting conveyor and above the secondary conveyor 12, strikes the lever 154, thereby closing switch 40 to provide a circuit from main 121 through switch 40, line 155 and coil 156 of the solenoid 157, to the opposite main 124. The solenoid 157 shifts the valve 94 to shut off the vacuum to all cups 99 which are in registry with the recesses 91, and momentarily applies air pressure from the conduit 95 through the vacuum cups 99 in registry with the recesses 91 to dislodge the sheet 14 from the diverting conveyor 13. The sheet 14 then drops onto the padded rolls 41 of the secondary conveyor 12 and is unloaded upon its arrival at the terminus of the multiple belt conveyor 43.

As the sheet disengages the levers 151 and 154, switch 40 is reopened to restore valve 94 to its normal position wherein the recesses 91 are again evacuated, and switch 152 is reopened, restoring valve 90 to its normal position wherein the vacuum is removed from recesses 87.

When a sheet 14 which is inferior to second quality glass arrives at station A, the operator depresses the button 21 of the switch 22 (FIGS. 1 and 7), thereby establishing a circuit from main 121, through branch line 158, switch 22, line 159 and the motor 160 of a timing device 161, to the opposite main 124. Cams 162 and 163 are rotated by the motor 160, the rise 164 on the cam 162 being retarded with respect to the rise 165 on the cam 163. Momentary closure of the switch 22 by the operator starts the motor 160 and rotates the cam 162 a distance sufficient for the switch 166 to close, thereby establishing a circuit from the main 121 through a branch line 167, switch 166 and line 168 which joins the line 159 in advance of the motor 160. The circuit through switch 166 holds the motor energized for one revolution at the end of which the rise 164 on cam 162 opens the switch 166.

The cam 163 is rotated by the motor 160 in timed relation with the cam 162 and as the inferior quality sheet 14 enters the nip of the accelerating rolls 23, the rise 165 on the cam 163 closes the switch 169, thereby establishing a circuit from main 121, through a branch line 170 and the coil 171 of the fluid cylinder 30, to the opposite main, which retracts the armature 172 and raises the pivoted section 28 of the roll conveyor 26 to the broken line position of FIG. 2. The inferior quality sheet 14 emerges from the accelerating rolls 23 to drop beneath the conveyor into a cullet bin. Rotation of the motor 160 is halted when cam 162 reopens switch 166. When the motor 160 stops, the rise 165 on the cam 163 will have released the switch 169 and the pivoted section 28 of the conveyor 26 will be in the solid line position shown in FIG. 2.

Figure 8:
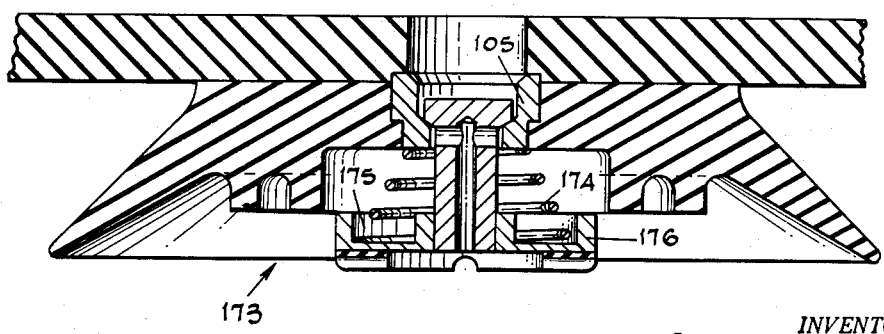
FIG. 8 is a modified form of a vacuum cup.

A modified form of the vacuum cup is generally indicated by the numeral 173 in FIG. 8. This form of the vacuum cup is particularly useful when pulsations from the vacuum pump cause the valves to flutter or bob while in register with either of the recesses 83 or 87. The sole difference between the two vacuum cups is that a conical spring 174 is seated at its lower end in a circular recess 175 machined into the upper surface of the sheet engaging button 176, and at its upper end bears against the bottom of the valve seat 105. Addition of the spring 174 overcomes any tendency for the button 176 to flutter or bob, but in all other respects, the vacuum cup 173 functions in the same manner as the preferred form shown in FIG. 6.

It is to be understood that the forms of the invention herewith shown and described are to be taken as illustrative embodiments only of the same, and that various changes in the shape, size and arrangement of parts may be resorted to without departing from the spirit of the invention.

I claim:

1. In sheet handling apparatus, in combination, a first substantially horizontal conveyor for supporting and carrying sheets along a definite path, a second substantially horizontal conveyor mounted above said first conveyor, a transfer apparatus positioned beneath said first conveyor and operable to raise selected sheets from said first conveyor into retentive engagement with said second conveyor, and means actuated by the sheet carried on the second conveyor for discharging said sheet from said second conveyor.

2. In sheet handling apparatus, in combination, a first conveyor for supporting and carrying sheets along a definite path, a second conveyor mounted above said first conveyor, a transfer apparatus positioned beneath said first conveyor and operable to raise selected sheets from said first conveyor, means on said second conveyor for engaging and supporting said sheets when raised by the transfer apparatus, and means actuated by the sheet carried on the second conveyor for discharging said sheet from said second conveyor.

3. In sheet handling apparatus, in combination, a first conveyor for supporting and carrying sheets along a definite path, a second conveyor mounted above said first conveyor, said second conveyor comprising an endless belt and vacuum cups carried by said belt, transfer apparatus positioned beneath said first conveyor and operable to raise selected sheets from said first conveyor into retentive engagement with said vacuum cups of said second conveyor, and means actuated by the sheet carried on the second conveyor for discharging said sheet from said second conveyor.

4. In sheet handling apparatus, in combination, a first conveyor for supporting and carrying sheets along a definite path, a second conveyor mounted above said first conveyor, means operable to apply a designating indicia to selected sheets moving along said first conveyor, transfer apparatus positioned beneath said first conveyor and actuated by the indicia on the sheets to raise said sheets from the first conveyor into retentive engagement with the second conveyor, and means actuated by the sheet carried on the second conveyor for discharging said sheet from said second conveyor.

5. In sheet handling apparatus, in combination, a first conveyor for supporting and carrying sheets along a definite path, means operable to apply a designating indicia to selected sheets moving along said conveyor, a second conveyor mounted above said first conveyor, said second conveyor comprising an endless belt and vacuum cups carried by said belt, transfer apparatus operable to raise the sheets from the first conveyor into retentive engagement with the vacuum cups of the second conveyor, said transfer apparatus including a sensing device actuated by the indicia on the sheets, and means actuated by the sheet carried on the second conveyor for discharging said sheet from said second conveyor.

6. In sheet handling apparatus, in combination, first and second substantially horizontal conveyors for supporting and carrying sheets along definite paths, a substantially horizontal diverting conveyor mounted above said first and second conveyors, means operable to raise a sheet from said first conveyor into retentive engagement with the diverting conveyor, and means actuated by the sheet carried on the diverting conveyor for discharging said sheet from said diverting conveyor onto said second conveyor.

7. In sheet handling apparatus, in combination, first and second substantially horizontal conveyors for supporting and carrying sheets along definite paths, means operable to apply a designating indicia to selected sheets carried on said first conveyor, a substantially horizontal diverting conveyor mounted above said first and second conveyors, transfer apparatus responsive to the indicia on the sheets to raise said sheets from said first conveyor into retentive engagement with the diverting conveyor, and means actuated by said sheets to discharge them from said diverting conveyor onto said second conveyor.

8. In sheet handling apparatus as claimed in claim 7, in which the diverting conveyor comprises an endless belt and vacuum cups carried by said belt for supporting the sheets when moved into retentive engagement with said diverting conveyor.

9. In sheet handling apparatus as claimed in claim 8, in which the sheet discharge means comprises means operable to break the vacuum and supply compressed air to said vacuum cups.

10. In sheet handling apparatus, in combination, a first substantially horizontal conveyor for transporting sheets along a definite path, means operable to apply a designating indicia to the surface of selected sheets carried on said first conveyor, a second substantially horizontal conveyor adjacent said first conveyor, a substantially horizontal diverting conveyor mounted above said first and second conveyors, said diverting conveyor comprising an endless belt having openings therein and vacuum cups mounted on the outer face of the belt in registry with said openings, transfer apparatus actuated by the indicia on the sheets to raise said selected sheets from the first conveyor into retentive engagement with the vacuum cups on the lower flight of the endless belt of the diverting conveyor, means for applying a vacuum to the vacuum cups to support the sheets, and means actuated by the sheets advancing on said diverting conveyor for breaking the vacuum to the vacuum cups and applying pressure thereto to discharge said sheets from said vacuum cups onto said second conveyor.

11. In sheet handling apparatus as claimed in claim 10, in which said diverting conveyor comprises a valve plate mounted above the lower flight of said endless belt and having a chamber with which the openings in the belt communicate as the belt moves therepast, and conduit means connecting said chamber to a vacuum supply for creating a vacuum in the vacuum cups when the openings are in communication with said chamber.

12. In sheet handling apparatus as claimed in claim 11, in which said valve plate also comprises a second chamber with which the openings in the endless belt communicate upon continued movement of said belt, a valve, conduit means connecting said second chamber to said valve, and switch means actuated by the sheets for controlling the valve to selectively connect said second chamber to the vacuum supply to retain the sheets in engagement with the vacuum cups and to a supply of compressed air for breaking the vacuum and discharging the sheets from the vacuum cups.

13. In sheet handling apparatus as claimed in claim 12, in which said valve plate is further provided with a third chamber disposed opposite a surface of said belt, and means operable to selectively connect said third chamber to the vacuum supply while the sheets are being discharged from said vacuum cups to maintain said belt against said valve plate.

14. In sheet handling apparatus as claimed in claim 10, in which said vacuum cups comprise a body portion having outwardly flaring lip and stop members inwardly of said lip for limiting the amount said lip can be deflected by a sheet, said body portion being also provided with a central passage, and a normally closed gravity valve located in said passage and movable by the sheet to open position when the sheet engages said lip.

15. In sheet handling apparatus as claimed in claim 10, in which said diverting conveyor comprises a valve plate mounted above the lower flight of said endless belt and having a first chamber with which the openings in the belt communicate as the belt moves therepast, a vacuum supply connected to said first chamber for creating a vacuum in the vacuum cups when the openings are in communication with the chamber, said valve plate being provided with a second chamber with which said openings communicate upon continued movement of said belt, a valve, conduit means connecting said second chamber to said valve, switch means actuated by the sheets for controlling the valve to selectively connect said second chamber to the vacuum supply to retain the sheets in engagement with the vacuum cups and to a supply of compressed air to break the vacuum and discharge the sheets from the vacuum cups, said valve plate having a third chamber disposed opposite a surface of said belt, and means operable to selectively connect said third chamber to the vacuum supply while the sheets are being discharged from said vacuum cups to maintain said belt against said valve plate.

16. In sheet handling apparatus as claimed in claim 4, in which said second conveyor comprises an endless belt and vacuum cups carried by said belt, and in which said transfer apparatus raises the sheets from said first conveyor into retentive engagement with said vacuum cups.

References Cited by the Examiner
UNITED STATES PATENTS

| | | | |
|---|---|---|---|
| 2,485,040 | 10/49 | Cupo | 198—20 X |
| 2,611,493 | 9/52 | Nordquist | 198—20 X |
| 2,884,130 | 4/59 | Bosch | 209—111.5 |
| 2,939,578 | 6/60 | Hansen | 209—82 |
| 2,989,306 | 6/61 | Ramm | 271—5 |

ROBERT B. REEVES, *Primary Examiner.*

CLAUDE A. LE ROY, FRANK L. ABBOTT, ABRAHAM BERLIN, ERNEST A. FALLER, SAMUEL F. COLEMAN, *Examiners.*